(12) United States Patent
Maier

(10) Patent No.: US 10,266,210 B2
(45) Date of Patent: Apr. 23, 2019

(54) PROFILE OF THE FRONT CROSS MEMBER

(71) Applicant: Thunder Power New Energy Vehicle Development Company Limited, Central (HK)

(72) Inventor: Jens Maier, Milan (IT)

(73) Assignee: Thunder Power New Energy Vehicle Development Company Limited, Central (HK)

( * ) Notice: Subject to any disclaimer, the term of this patent is extended or adjusted under 35 U.S.C. 154(b) by 0 days.

(21) Appl. No.: 15/697,081

(22) Filed: Sep. 6, 2017

(65) Prior Publication Data

US 2018/0065578 A1 Mar. 8, 2018

Related U.S. Application Data

(60) Provisional application No. 62/384,298, filed on Sep. 7, 2016.

(51) Int. Cl.
*B62D 25/08* (2006.01)
*B62D 25/20* (2006.01)
*B60R 19/03* (2006.01)
*B60R 19/18* (2006.01)
*B60R 19/34* (2006.01)
*B62D 21/15* (2006.01)
*B62D 29/00* (2006.01)

(52) U.S. Cl.
CPC .......... *B62D 25/2018* (2013.01); *B60R 19/03* (2013.01); *B60R 19/18* (2013.01); *B60R 19/34* (2013.01); *B62D 21/152* (2013.01); *B62D 25/087* (2013.01); *B62D 25/2045* (2013.01); *B62D 29/008* (2013.01); *B60Y 2200/91* (2013.01); *B62D 25/20* (2013.01)

(58) Field of Classification Search
CPC ............................ B62D 25/2018; B62D 25/08
USPC ................................ 296/133, 187.09, 203.02
See application file for complete search history.

(56) References Cited

U.S. PATENT DOCUMENTS

| | | | |
|---|---|---|---|
| 6,258,465 B1 | 7/2001 | Oka et al. | |
| 8,398,158 B2 * | 3/2013 | Mildner | B62D 25/2018 296/187.08 |
| 9,637,175 B2 * | 5/2017 | Bogachuk | B62D 25/04 |
| 2002/0042996 A1 | 4/2002 | Sato et al. | |

(Continued)

FOREIGN PATENT DOCUMENTS

| | | |
|---|---|---|
| EP | 2 468 606 A2 | 6/2012 |
| EP | 2 815 953 A1 | 12/2014 |

OTHER PUBLICATIONS

European Search Report for EP 17190005 dated Jan. 5, 2018, all pages.

*Primary Examiner* — Dennis H Pedder
(74) *Attorney, Agent, or Firm* — Kilpatrick Townsend & Stockton LLP

(57) ABSTRACT

A front impact system for an electric vehicle includes a front cross beam extending across a front end of the electric vehicle. The front cross beam defines an interior comprising at least one rib extending along a length of the front cross beam. A left crash beam is coupled with a rear surface of the front cross beam. A right crash beam is coupled with the rear surface of the front cross beam. The front cross beam is configured to transfer force from a front collision to one or both of the left crash beam or the right crash beam.

10 Claims, 9 Drawing Sheets

(56) References Cited

U.S. PATENT DOCUMENTS

| | | | |
|---|---|---|---|
| 2004/0135382 A1* | 7/2004 | Sakuma | B60R 19/34 293/102 |
| 2009/0152881 A1* | 6/2009 | Shin | B60R 19/18 293/102 |
| 2016/0039374 A1* | 2/2016 | Sugano | B60R 19/04 293/133 |

* cited by examiner

PROFILE OF THE FRONT CROSS MEMBER

CROSS-REFERENCE TO RELATED APPLICATION

The present application claims the benefit of U.S. Provisional Application No. 62/384,298, filed Sep. 7, 2016, the entire contents of which are hereby incorporated by reference for all purposes.

BACKGROUND OF THE INVENTION

There are many problems unique to electric vehicles, oftentimes due to the presence of large and/or numerous batteries used to power the electric motor and other components of the vehicle. These batteries are often bulky, and add significant weight to the vehicles. These considerations present challenges in designing a particularly efficient and practical electrical vehicle. Additionally, these batteries may be particularly susceptible to damage during a collision. Damage to a battery may be especially dangerous by presenting a fire and/or corrosive hazard. As such, protecting the batteries from damage remains a difficult challenge unique to the field of electric vehicles.

Vehicle manufacturers have added a number of new structural features to vehicles to improve safety and/or performance. Many of these structural features are applicable to electric, hybrid, and non-electric vehicles equally, while others place a greater emphasis on the vehicle motor type, such as a vehicle base plate with increased thickness for protecting an electric car battery over a specific region of the vehicle. Structural improvements that increase either safety or performance without a significant compromise of the other remain important objectives of vehicle manufacturers.

Electric vehicles are becoming an increasingly viable alternative to traditional vehicles with internal combustion engines. Electric vehicles may have advantages in their compactness, simplicity of design, and in being potentially more environmentally friendly depending on the means by which the electricity used in the vehicle was originally generated. The prospect of using renewable energy sources to power automobiles in place of gasoline has obvious advantages as oil reserves across the globe become increasingly depleted.

BRIEF SUMMARY OF THE INVENTION

In one aspect, a front impact system for an electric vehicle is provided. The front impact system may include a front cross beam extending across a front end of the electric vehicle. The front cross beam may define an interior comprising at least one rib extending along a length of the front cross beam. The front impact system may also include a left crash beam coupled with a rear surface of the front cross beam and a right crash beam coupled with the rear surface of the front cross beam. The front cross beam may be configured to transfer force from a front collision to one or both of the left crash beam or the right crash beam.

In another aspect, a front impact system for an electric vehicle may include a front cross beam extending across a front end of the electric vehicle. The front cross beam may have a generally rectangular cross-section defined by a front wall, a top wall, a rear wall, and a bottom wall. The front cross beam may include a rib extending along a length of the front cross beam between a center of the front wall and a center of the rear wall. The front impact system may also include a left crash beam coupled with a rear surface of the front cross beam and a right crash beam coupled with the rear surface of the front cross beam. The front cross beam may be configured to transfer force from a front collision to one or both of the left crash beam or the right crash beam.

In another aspect, a method of directing force from a front impact with an electric vehicle is provided. The method may include receiving a collision at a front cross beam of the electric vehicle and absorbing at least a portion of a force from the collision at the front cross beam by crumpling a portion of the front cross beam including a horizontal rib extending between a front wall and a rear wall of the front cross beam. The method may further include transferring at least a portion of the force from a rear edge of the front cross beam to at least one longitudinal crash beam and absorbing at least a portion of the force by crumpling at least some of the at least one longitudinal crash beam.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The systems and methods described herein relate generally to improvements for electric vehicles. Due to the size and weight considerations of the batteries required to power such vehicles, as well as the need to make electric vehicles as safe as possible, each component within the electric vehicles must be designed with particular characteristics in mind. Specifically, considerations related to the weight and structural integrity of each component must be weighed to ensure that the electric vehicles are both efficient and safe to operate. For example, the body of the vehicle must be stiff, efficient, and lightweight. A lightweight body helps counteract the additional weight of the batteries, which may be in the form of several large batteries, or numerous (sometimes thousands) of smaller batteries wired together. The stiff body helps make the vehicle more stable during cornering and also helps limit damage to the body and batteries during a collision. Protection of the batteries during a collision is particular important, as the large number of batteries pose a significant fire hazard and may also expose passengers and others to highly corrosive material. Due to this high safety risk, it is imperative that the body structure be designed to withstand high force collisions from any direction.

Figure 1:
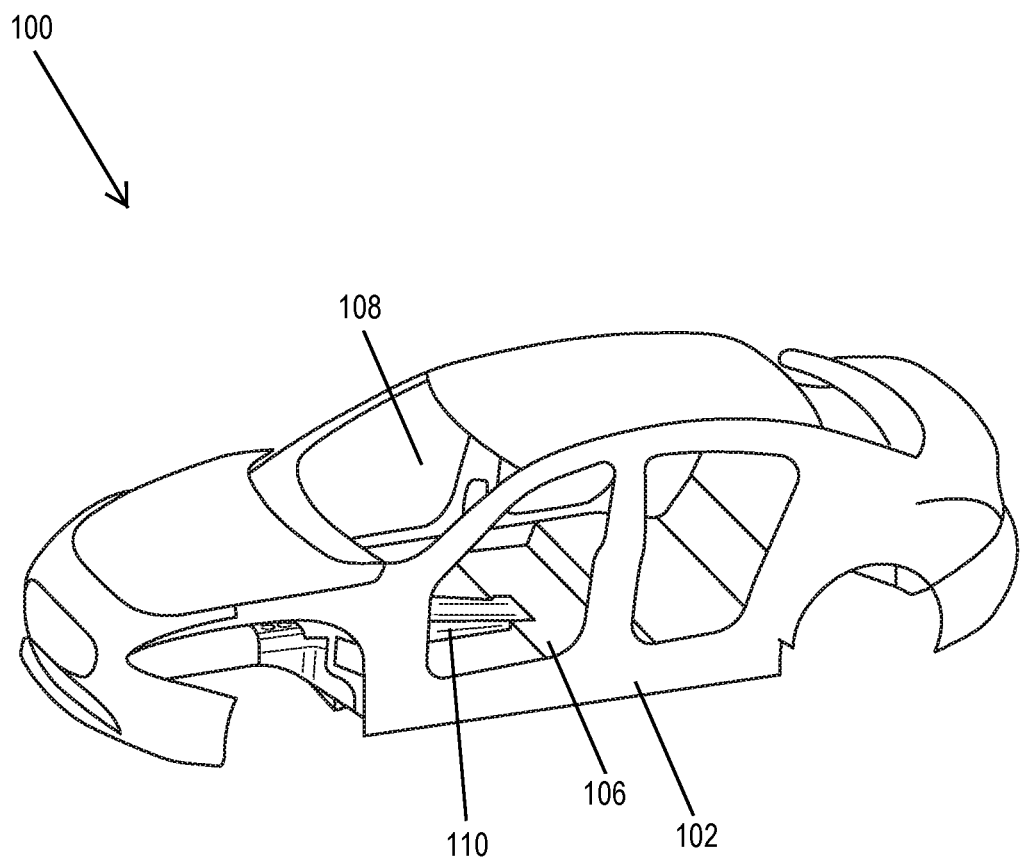
FIG. 1 depicts an electric vehicle according to embodiments.

Turning now to FIG. 1, one embodiment of an electric vehicle 100 is shown. While shown here as an electric automobile, electric vehicle 100 may be any motorized vehicle that is powered by electricity. For example, electric vehicle 100 may include vehicles such as cars, buses, trains, trucks, trams, watercraft, aircraft, and/or any other type of transportation mechanism.

Here, much of the main body 102 of the electric vehicle 100, especially those components designed to form the skeleton of the vehicle and those components used for collision protection, are made of aluminum or alloys containing aluminum, although it will be appreciated that other materials may be considered. Aluminum alloys provide strong, yet lightweight components that help shed weight to compensate for the high weight of the batteries necessary to power the electric vehicle. For electric vehicles, an increased emphasis is placed on protection of the batteries as damage to battery cells can cause explosion and fires within the vehicle. Such problems are compounded due to the large amount of space batteries must occupy within electric vehicles in order to maintain practical driving ranges. Therefore, vehicle alterations that provide increased protection along edges and corners of the vehicle battery are advantageous. Such alterations may include considerations related to, but not limited to providing: (1) increased rigidity of the vehicle, (2) increased absorption of energy from a collision, and (3) increased efficiency of transfer of energy/force stemming from an impact to the vehicle's body to lessen the potential impact applied to the vehicle battery and to passengers in the vehicle.

Battery elements 104 (shown in FIG. 2) are positioned underneath a floor structure 106 of the electric vehicle 100. Such positioning provides several benefits. First, the battery elements are isolated from the passenger compartment, largely by an aluminum (or other metallic material) floor structure 106, which helps increase passenger safety. The placement of the battery elements 104 underneath the vehicle 100 also allows the battery elements 104 to be connected to electrical systems of the vehicle 100 from underneath the floor structure 106. This enables the battery elements 104 to be changed out from the exterior of the vehicle 100. For example, the vehicle 100 may be raised up and the battery elements 104 may be decoupled from the underside of the vehicle 100. As just one example, a number of bolts or other fasteners may be removed and the battery elements 104 may be lowered from the vehicle 100. The battery elements 104 may be disconnected and new battery elements 104 may be connected and fastened to the underside of the vehicle 100. This allows old batteries to be replaced easily, and also enables a quick swap of depleted battery elements 104 for charged battery elements 104, serving as a method of rapidly charging the vehicle 100 for longer trips. The placement of the battery elements 104 also places much of the weight of the vehicle 100 near the ground, thus lowering the center of gravity of the vehicle 100, which allows the vehicle 100 to corner better and reduces the odds of a rollover.

Unlike automobiles that utilize internal combustion engines and include drivetrains that extend along a length of the vehicle, electric vehicle 100 is driven by one or more electric motors positioned near the wheel axles. As a result, there is no need for a longitudinal drive train. To help isolate a passenger compartment 108 from the battery elements 104 while providing access for connections of the battery elements 104 to be connected to electric systems within the passenger compartment 108 and to the one or more electric motors, the passenger compartment may be provided with a rigid tunnel 110 protruding upward from a floor structure 106 of the passenger compartment 108. However, unlike in conventional gas-powered vehicles where a tunnel may be provided to provide clearance for a drivetrain, rigid tunnel 110 is included to provide clearance for a portion of the battery elements 104 used to supply power to the electric vehicle 100. The rigid tunnel 110 may not only provide a housing for a portion of the battery assembly, but may serve a number of other functions. As just one example, the rigid tunnel 110 may help absorb and transfer force away from passengers in the event of a collision. In such embodiments, the rigid tunnel 110 may be formed of carbon fiber or another composite material that is extremely strong and lightweight. In other embodiments, the rigid tunnel 110 may serve as part of an air ventilation system, with hot or cold air being vented to the passenger compartment 108 through a portion of the rigid tunnel 110.

Figure 2:
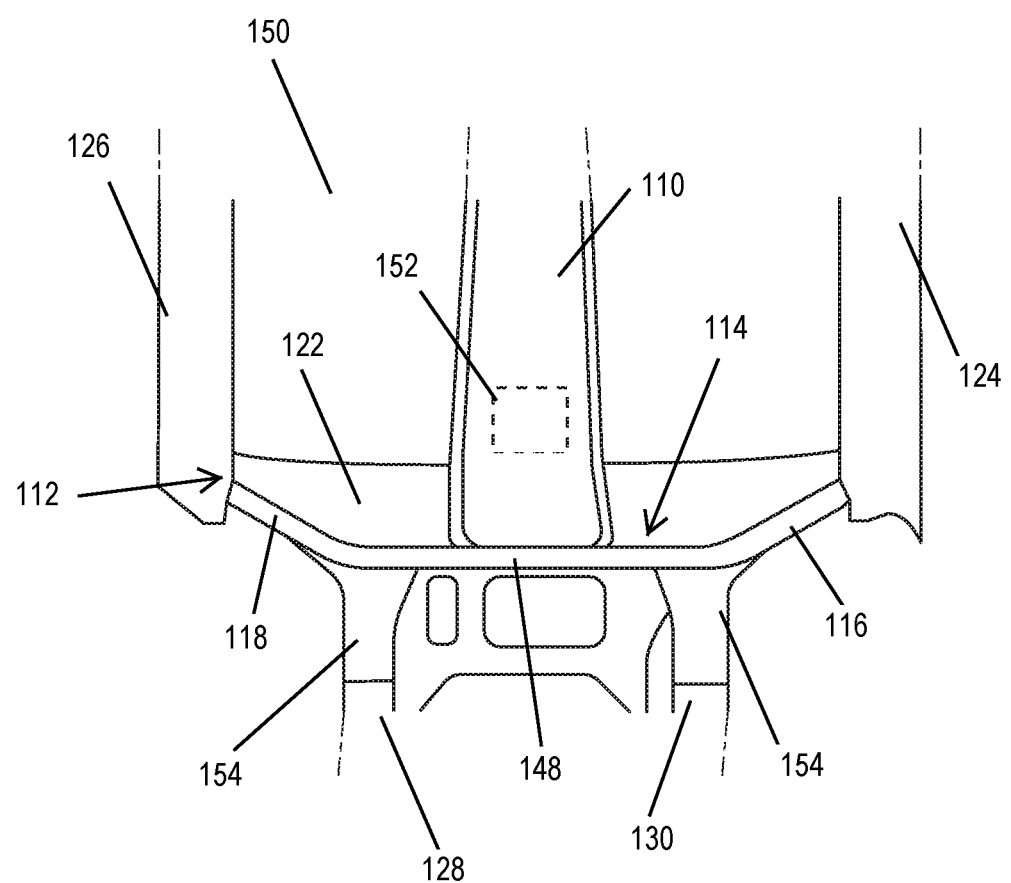
FIG. 2 depicts a top view of a power system of an electric vehicle according to embodiments.

FIG. 2 depicts one embodiment of a power system of the electric vehicle 100. The power system may include a firewall 112 positioned between a motor compartment and a passenger compartment 108 of the electric vehicle 100. The firewall 112 may be formed of several components. For example, the firewall 112 may include a front cross beam 114 having a left portion 116 and a right portion 118 separated by a medial portion 184 extending there between. The left portion 116 and the right portion 118 may each be bent rearward relative to the medial portion 184, thus defining a foot well or other front portion of the passenger compartment 108. For example, the left portion 116 and the right portion 118 may be bent backward at an angle of between about 10 and 40 degrees, more typically between about 25 and 35 degrees, relative to the medial portion 184. The front cross beam 114 may have a generally rectangular cross-section that defines an open interior. In some embodiments, the open interior may include a number of ribs that extend along a length of the front cross beam 114, as better shown in FIG. 6. The firewall 112 may also include an angled portion 122 of the floor structure 106. A horizontal flat portion 150 of floor structure 106 may be coupled with and/or extend rearward from the firewall 112. The flat portion 150 may define an aperture 152 between the firewall 112 and one or more central support beams 132 of the floor structure 106. The angled portion 122 may be coupled with a bottom end of the front cross beam 114. Such coupling is further described in relation to FIG. 6.

In some embodiments, a left longitudinal support beam 124 may be coupled with the left portion 116 and/or the angled portion 122 of the floor structure 106. A right longitudinal support beam 126 may be coupled with the right portion 118 and/or the angled portion 122 of the floor structure 106. A right front crash beam 128 may be coupled with the medial portion 184 and/or the right portion 118 and may be generally orthogonal to a right end of the medial portion 184. A left front crash beam 130 may be coupled with the medial portion 184 and/or the left portion 116 and may be generally orthogonal to a left end of the medial portion 184. In some embodiments, the crash beams 128 and 130 may be coupled directly with the front cross beam 114, while in other embodiments the crash beams 128 and 130 may be coupled with the front cross beam 114 via crash elements 154.

Figure 3:
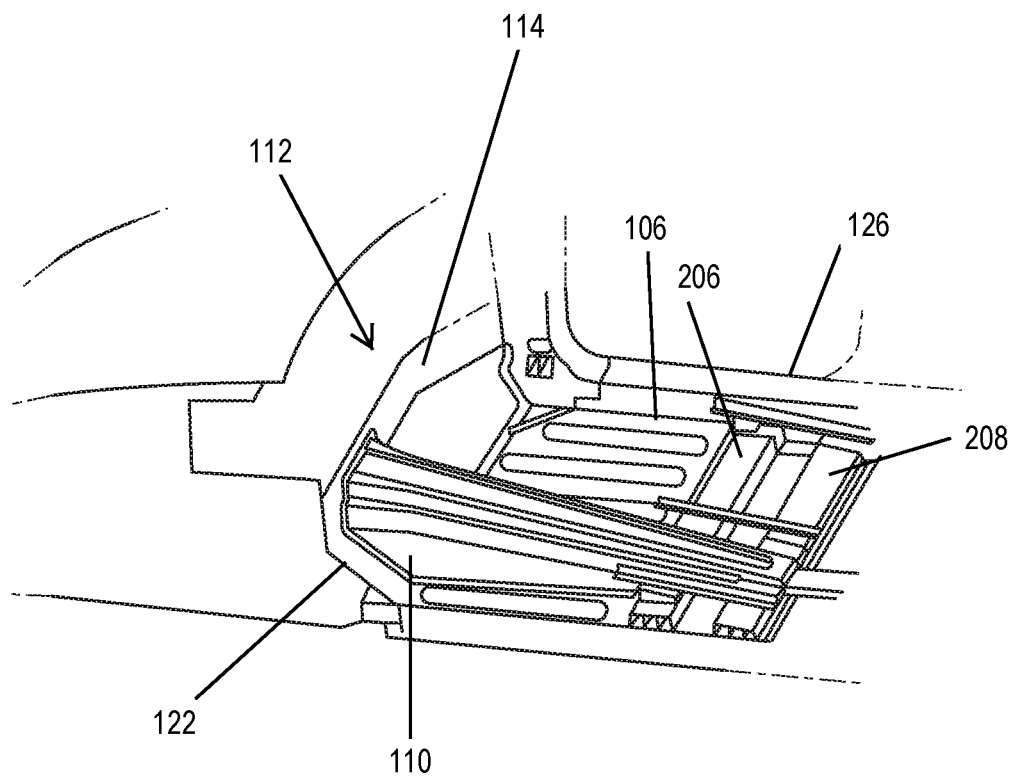
FIG. 3 depicts an isometric view of a tunnel of an electric vehicle according to embodiments.

In some embodiments, the firewall 112 may be coupled with the rigid tunnel 110, which may extend rearward from the firewall 112 to one or more central cross beams 132 as shown in FIG. 3. For example, a front edge of the rigid tunnel 110 may be coupled with a medial portion of the angled portion 122 and a medial portion of the front cross beam 114. The front edge of the rigid tunnel 110 may be open, such that access to the motor compartment may be provided underneath the rigid tunnel 110. A rear portion of the rigid tunnel 110 may be coupled with the central cross beams 132. For example, a forward most of the central cross beams 132 may be coupled with an underside of the rigid tunnel 110, such as within a notch in the rigid tunnel 110 that is configured to receive the forward most central cross beam 132. The rearmost central cross beam 132 may be configured to couple with and/or near a rear edge of the rigid tunnel 110. The central cross beams 132 may extend laterally across a width of the passenger compartment 108. In some embodiments, a top surface of one or more of the central cross beams 132 may be configured to be used as mounting points for the front seats. For example, the top surface of one of more of the central cross beams 132 may define apertures that are configured to receive bolts and/or other fastening mechanisms for coupling seat rails 164 and/or other seat mounts to the central cross member(s) 132. In some embodiments, seat brackets may be mounted to one or more of the central cross beams 132. These brackets may then receive seat rails 164 with which seats may be mounted. Oftentimes, each seat will be mounted to two seat rails 164, although it will be appreciated that other numbers of rails 164 may be used.

In some embodiments, the central cross beams 132 (as well as other support members secured to the floor structure 106, as well as the floor structure 106 itself) may be configured to have the battery assembly 104 mounted thereon. For example, a lower surface of one or more of the central cross beams 132 may be configured to receive one or more removable fastening mechanisms, such as bolts, that are used to secure the battery assembly 104 to an underside of the floor structure 106. As just one example, the central cross beams 132 may be positioned atop the floor structure 106, with the battery element 104 positioned against an underside of the floor structure 106 (possibly with one or more intervening layers and/or components between the battery element 104 and the floor structure. One or more bolts may extend from an underside of the battery element 104, through the floor structure 106, and into an interior of one or more of the central cross beams 132. The bolts or other fasteners may be positioned through apertures in the battery element 104 and/or a flange of the battery element 104. The central cross beams 132 provide strong mounting locations for the battery element 104, allowing the battery element 104 to be larger and provide the vehicle 100 with a longer range.

The central cross beams 132 may also serve to strengthen the sides of the passenger compartment 108 and to protect the passenger compartment 108 in the event of an impact. The front cross beam 114 (and rest of firewall 112) may be configured to transfer force from a frontal collision from the front crash beams 128 and 130 to the one or more central cross beams 132 via the rigid tunnel 110. Additionally or alternatively, the front cross beam 114 (and rest of firewall 112) may also be configured to transfer force from a frontal collision from the front crash beams 128 and 130 to the left longitudinal support beam 124 and the right longitudinal support beam 126.

Figure 4:
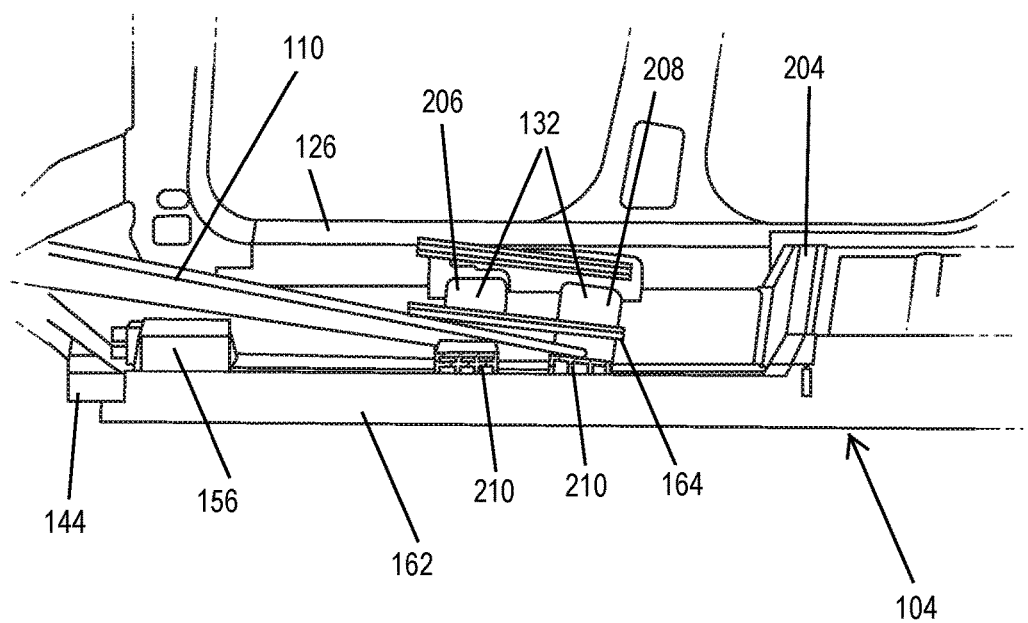
FIG. 4 depicts a cross-section view the tunnel of FIG. 3 according to embodiments.

Battery assembly 104 may be configured to mount with an underside of the floor structure 106. The battery assembly 104 may include at least one battery 162, but often includes a large number of batteries ranging from dozens to thousands, depending on the size of each of the batteries. In some embodiments, the battery 162 includes a number of battery units arranged in two tiers as best seen in FIG. 4. For example, a first tier may extend underneath all or part of the passenger compartment 108, while a second tier may be stacked upon a portion of the first tier such that it extends upward at a position rearward of the passenger compartment 108. In some embodiments, the upper tier of the battery assembly 104 may be positioned rearward of a rear cross beam 204. Rear cross beam 204 may extend across a width of the passenger compartment 108. The rear cross beam 204 may be configured to receive one or more fasteners configured to secure the battery assembly 104 to the underside of the vehicle 100. In some embodiments, the rear cross beam 204 may also be used to mount one or more rear seats within the passenger compartment 108.

The battery assembly 104 may also include a battery connector housing 156. The battery connector housing 156 may be configured to house at least one battery connector therein. The battery connector housing 156 may define at least one electric connector configured to couple with at least one electric system of the electric vehicle 100, such as the electric motor. The battery connector housing 156 may be configured to be inserted within the aperture 152 of the floor structure 106 such that at least a portion of the battery connector housing 156 extends above a top surface of the floor structure 106. This allows the electric connectors to be accessible through a front opening of the rigid tunnel 110, enabling the battery element 104 to be electrically coupled to both the motor and the other electrical systems of the vehicle 100. Battery assembly 104 may be secured to the underside of the floor structure 106 using fasteners accessible from the underside of the floor structure 106 such that the battery assembly 104 is removable from the electric vehicle 100 without accessing the passenger compartment 108. These fasteners may be spaced apart along the underside of the vehicle 100 at the floor structure 106, central cross beams 132, a subfloor cross beam 160, and/or other structural elements, with a spacing and number of fasteners being determined by a weight, size, and/or shape of the battery element 104.

Figure 5:
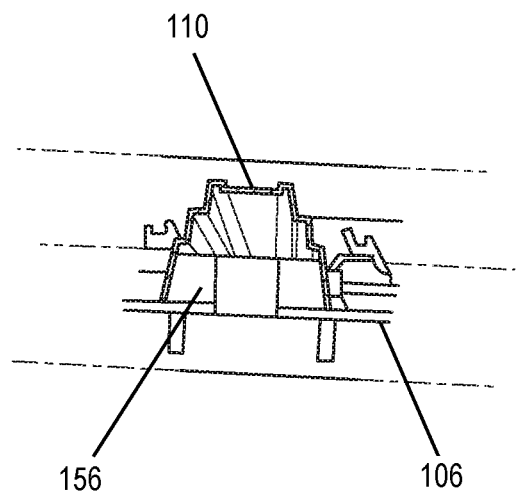
FIG. 5 depicts a front cross-section view of the tunnel of FIG. 3 according to embodiments.

Rigid tunnel 110 may be coupled with the firewall 112, such as at a rear surface of the firewall 112. The rigid tunnel 110 may also be coupled with the floor structure 106 and the central support beams 132. The rigid tunnel 110 may be configured to cover the portion of the battery connector housing 156 that extends above the floor structure 106 such that the passenger compartment 108 is sealed from the battery connector housing 156. In some embodiments, the rigid tunnel 110 has a cross sectional profile that generally matches a profile of the battery connector housing 156 as shown in FIG. 5. As seen here, the rigid tunnel 110 may include extra space above the battery connector housing 156. In such embodiments, the extra space may be used to for additional features. For example, in one embodiment, the extra space may be used to provide a conduit for the air conditioner and heating system. In some embodiments, the floor structure 106 includes a sealing element (not shown) protruding upward and contacting an inner surface of the rigid tunnel 110 between the battery connector housing 156 and the central support beams 132. The sealing element may have a shape corresponding to the rigid tunnel 110. This sealing element may further insulate the passenger compartment 108 from the battery element 104, especially as the profile of the rigid tunnel 110 decreases in size at rearward portions.

In some embodiments, the rigid tunnel 110 may be designed to transfer frontal impact away from occupants of the vehicle 100. For example, the rigid tunnel 110 may be coupled with a rear surface of the front cross beam 114 and a top surface of the angled medial section 142 of the floor structure 106. Frontal impact forces received by the firewall 112 may be transferred through the rigid tunnel 110, which may transmit the forces to one or more central crossbeams 132 positioned rearward of the firewall 112. Such diversion of forces may ensure that a maximum amount of force is directed around occupants of the vehicle 100. To provide the strength necessary to transfer the impact forces while limiting the amount of weight added, the rigid tunnel 110 may be formed from carbon fiber.

Because the battery element 104 is positioned under the rigid tunnel 110, to ensure maximum safety of the passenger compartment 108, it may be desirable to include an acid resistant and/or flame resistant material to the rigid tunnel 110 to increase protection of the passenger compartment 108 in the event of battery damage, which may result in exposure to battery acid or flames. For example, the rigid tunnel 110 may be formed from materials with strong resistance to flame and/or acid. In other embodiments, one or more surfaces of the rigid tunnel 110 may be coated with an acid resistant and/or flame resistant material. In particular, a lower surface of the rigid tunnel 110 may be coated to protect against direct exposure to a damaged battery. In other embodiments, a separate acid and/or fire resistant material may be coupled with an underside of the rigid tunnel 110. Additionally, due to the rigid tunnel 110 being configured to cover a hole in the floor structure 106 that enables the connector 158 to extend upward above the floor structure 106, the rigid tunnel 110 may include thermal insulation and/or acoustic insulation, as such insulation may not be included on the battery element 104. This allows road noise, as well as thermal effects from the environment and/or the battery element 104 to be reduced within the passenger compartment 108.

Figure 6:
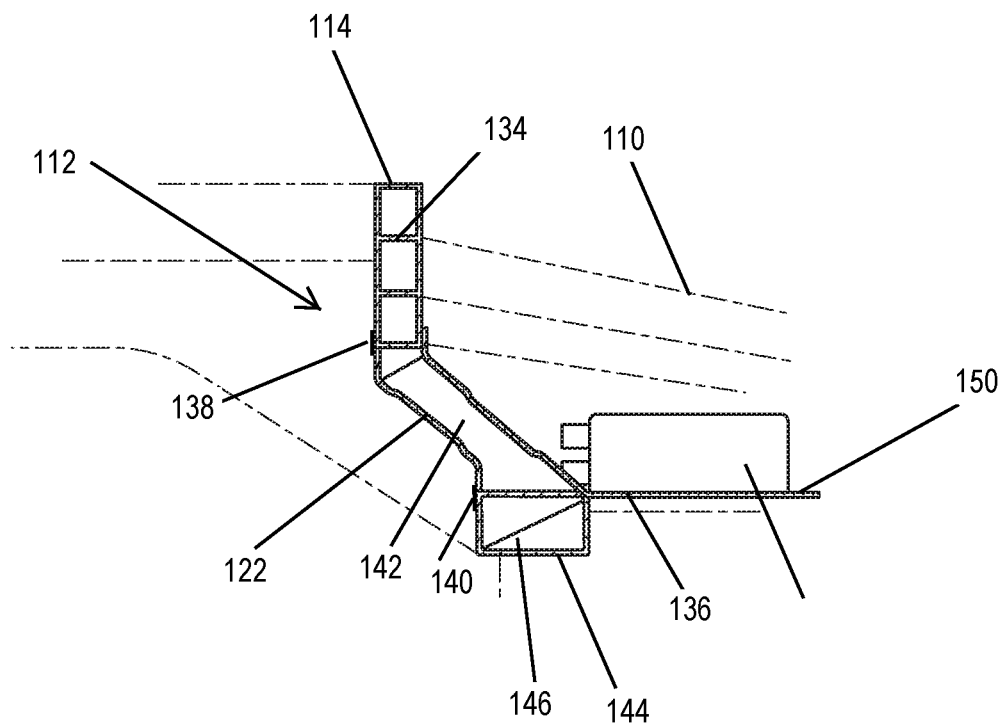
FIG. 6 depicts a side cross-section view of the firewall of FIG. 2 an electric vehicle according to embodiments.

FIG. 6 shows a cross-sectional view of the firewall 112 of FIG. 2. As shown here, firewall 112 is formed from the junction of the front cross beam 114 and the angled portion 122 of the floor structure 106. As noted above, the firewall 112 defines a front portion of the passenger compartment 108, such as a passenger and/or driver foot well and separates the passenger compartment 108 from a motor compartment of the electric vehicle 100. As shown here, firewall 112 includes front cross beam 114 having left portion 116, right portion, 118, and medial portion 184 extending between the left portion 116 and right portion 118, which may be bent rearward relative to the medial portion 184. Front cross beam 114 may define an interior including a number of ribs 134 that extend along a length of the front cross beam 114. For example, at least two ribs 134 may extend from a front wall of the front cross beam 114 to a rear wall of the front cross beam 114. The front cross beam 114 may have a generally rectangular cross-section. The ribs 134 may be positioned at regular intervals as shown here, or may be spaced at irregular intervals. Here, two ribs 134 are spaced equidistant from one another and the top and bottom of the front cross beam 114, forming three rectangular chambers within the front cross beam 114. The use of ribs 134 helps stiffen and strengthen the front cross beam 114 without adding a substantial amount of material or weight, thereby allowing the front cross beam 114 to handle larger impact forces in the event of a collision.

The firewall 112 may also include floor structure 106. Specifically, floor structure 106 may include an angled portion 122 that angles upward from a base 136 of the floor structure 106 to form a portion of a front foot well of the passenger compartment 108. This angled portion 122 may be coupled with a bottom end of the front cross beam 114. For example, the angled portion 122 may include at least one upper flange or mounting interface 138 that is generally aligned with a vertical axis of the firewall 112. The upper flanges 138 may be coupled with a bottom end of the front cross beam 114. For example, a front upper flange 138 may be secured against a front surface of the front cross beam 114 and a rear upper flange 138 may be secured against a rear surface of the front cross beam 114 such that the front cross beam 114 is secured between the front upper flange 138 and the rear upper flange 138. For example, the front cross beam 114 may be inserted between the upper flanges 138 and secured using one or more fasteners. The angled portion 122 may also include at least one lower flange or mounting interface 140 that is separated from the upper flange 138 by an angled medial section 142 that slopes downward from front to back. The lower mounting interface 140 may include a front lower flange 140 configured to be fastened against a front surface of a subfloor cross beam 144 and a rear lower flange 140 configured to be fastened against a top surface of the subfloor cross beam 144.

In some embodiments, the angled medial section 142 of the floor structure 106 includes one or more embossed features formed in a top surface and/or a bottom surface of the angled medial section 142. The angled medial section 142 may also include a number of ribs (not shown) extending from a top surface to a bottom surface of the angled medial section 142. The ribs and/or embossed features may serve to further strengthen the floor structure 106 without adding substantial material and weight. The lower flange 140 may be generally aligned with a horizontal axis of the firewall 112. The firewall 112 may also include subfloor cross beam 144 positioned underneath the floor structure 106 and coupled with the lower flange 140 such that the subfloor cross beam 144 is spaced laterally rearward of the medial portion 184 of the front cross beam 114. The subfloor cross beam 144 may define an interior that includes at least one rib 146 extending along a length of the subfloor cross beam 144. In some embodiments, rib 146 may extend between a front corner and a rear corner of the subfloor cross beam 144. For example, the rib 146 may extend from a front lower corner of the subfloor cross beam 144 to a rear upper corner of the subfloor cross beam 144. This rib 146 helps stiffen and strengthen the subfloor cross beam 144 without adding a substantial amount of material or weight. In some embodiments, the subfloor cross beam 144 may receive one or more fasteners for coupling the battery assembly 104 to the underside of the vehicle 100.

Oftentimes, the firewall 112 may be formed entirely from aluminum. For example, the front cross beam 114 and the subfloor cross beam 144 may be formed of extruded aluminum, which makes it easier to form any ribs integral with the beams to ensure maximum strength. In some embodiments, the angled portion 122 of the floor structure 106 (and the floor structure 106 itself) may be formed from cast or pressed aluminum. Such formation is more suited for producing the embossed features within surfaces of the floor structure 106 that increase the strength and/or stiffen the floor structure 106.

In some embodiments, a front surface of the firewall 112 is coupled with one or more front crash beams 148. In some embodiments, the firewall 112 may be directly coupled to the front crash beams 148, while in other embodiments, one or more components, such as a crash element 154, may be coupled between the front crash beams 148 and the firewall 112. In the event of a frontal impact, the firewall 112 may be configured to receive and absorb a force transferred from the front crash beams 148. The firewall 112 may also be configured to direct force away from passengers, such as by directing the force around the front seats to structural components designed to handle impact forces. For example, as described with regard to FIG. 2, ends of the firewall 112 may be coupled with longitudinal support beams 124 and 126 that extend along sides of the vehicle 100. Impact forces may be transferred to these longitudinal support beams 124 and 126 to direct the main forces around the passenger compartment 108 to protect occupants in the event of a collision. The firewall 112 may also be coupled with the rigid tunnel 110. For example, the rigid tunnel 110 may be coupled with a rear surface of the front cross beam 114 and a top surface of the angled medial section 142 of the floor structure 106. Frontal impact forces received by the firewall 112 may be transferred through the rigid tunnel 110, which may transmit the forces to one or more central crossbeams (not shown) positioned rearward of the firewall 112. Such diversion of forces may ensure that a maximum amount of force is directed around occupants of the vehicle 100.

Figure 7:
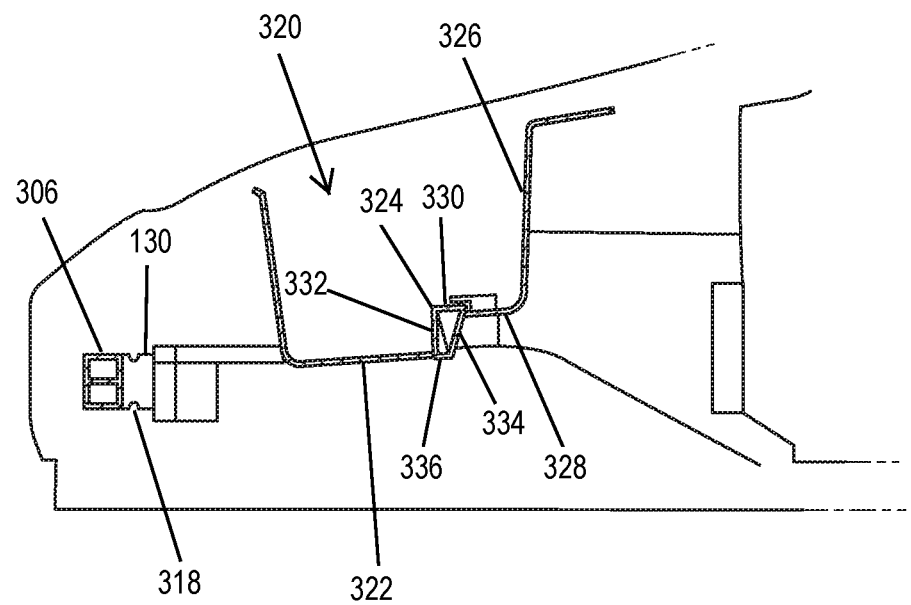
FIG. 7 stiffening element to protect against a side or frontal impact for an electric vehicle according to embodiments.

FIG. 7 depicts a stiffening element to protect against a side or frontal impact for the electric vehicle 100. The system may include a front crash cross beam 306 extending across a front end of the electric vehicle 100. The front crash cross beam 306 may serve as a bumper or forwardmost impact element of the vehicle 100. For example, a nose of the body of vehicle 100 may be positioned immediately in front of and cover the front crash cross beam 306. In some embodiments, a first end and a second end of the front crash cross beam 306 bend backward relative to a medial portion of the front crash cross beam 306, thereby helping to define a front end shape of the vehicle 100. The front crash cross beam 306 may have a generally rectangular cross-section having an outer periphery defined by a top wall 308, a front wall 310, a lower wall 312, and a rear wall 314. In some embodiments, the outer periphery of the front crash cross beam 306 may define an interior having one or more ribs extending along a length of the front crash cross beam 306. For example, a rib 316 may extend horizontally between a center of the front wall 310 a center of the rear wall 314. Rib 316 may make front crash cross beam 306 more rigid and allow the front crash cross beam 306 to absorb a greater amount of impact force, as more force is needed to crumple or otherwise bend the rib 316, along with the rest of the front crash cross beam 306. Rib 316 may have a thickness of between about 0-1 cm to provide necessary strength while still keeping a weight of the front crash cross beam 306 sufficiently low. While shown with a single rib 316, it will be appreciated that any number of ribs may be included within the interior of the front crash cross beam 306. These ribs may be provided in any arrangement, however ribs extending either horizontally or diagonally between the front wall 310 and the rear wall 314 provide the most resistance to front impacts.

To facilitate the formation of the ribs, the front crash cross beam 306 may be extruded from aluminum such that any ribs are formed along with the outer walls of the front crash cross beam 306. In some embodiments, connection points between the ribs and the outer walls of the front crash cross beam 306 may taper outward such that a thickness near the connection point is greater than a thickness of the rest of the ribs. Similarly, junctions of the ribs with one another may also have greater thicknesses than the rest of the ribs.

The front crash beams 128 and 130 may be coupled with a rear surface of the front crash cross beam 306. Oftentimes, the left front crash beam 128 and right front crash beam 130 may be coupled to the medial portion of the front crash cross beam 306 such that the bent first end and second end are disposed laterally outward of the left front crash beam 128 and right front crash beam 130, respectively. The front crash cross beam 306 may be configured to transfer force from a front collision to the left front crash beam 128 and/or the right front crash beam 130. In some embodiments, each of the left front crash beam 128 and the right front crash beam 130 define an interior having one or more ribs to further strengthen the beam. Additionally, each of the front crash beams 128 and 130 may include one or more dimples 318 formed in an outer periphery of the crash beam. Oftentimes, the dimples 318 may be formed on corners of the crash beams 128 and 130 such that the dimples extend into two side surfaces of the crash beams 128 and 130. Dimples 318 may serve to encourage the front crash beams 128 and 130 to crumple in an accordion-like manner in the event of a frontal impact to absorb as much of the impact force as possible prior to transferring the forces back to the firewall 112 and the other structural members of vehicle 100.

The system may also include firewall 112 that is configured to separate a passenger compartment of the electric vehicle from a motor compartment or other forward portion of the electric vehicle 100. The firewall 112 may be formed of several components. For example, the firewall 112 may include a front cross beam 114 having a left portion 116 and a right portion 118 separated by a medial portion 184 extending therebetween. The left portion 116 and the right portion 118 may each be bent rearward relative to the medial portion 184, thus defining a footwell or other front portion of the passenger compartment 108. For example, the left portion 116 and the right portion 118 may be bent backward at an angle of between about 10 and 40 degrees, most commonly between about 25 and 35 degrees, relative to the medial portion 184. The front cross beam 114 may have a generally rectangular cross-section that defines an open interior. In some embodiments, the open interior may include a number of ribs that extend along a length of the front cross beam 114. The firewall 112 may also include an angled portion 122 of the floor structure 106. The angled portion 122 may be coupled with a bottom end of the front cross beam 114.

The system may further include a trunk 320 positioned between the left front crash beam 128 and the right front crash beam 130. The trunk 320 may be positioned between the front crash cross beam 306 and the firewall 112. The trunk 320 may define a storage compartment between the front crash cross beam 306, the firewall 112, and the front crash beams 128 and 130. In some embodiments, the trunk 320 may include a hinged trunk hood (not shown) configured to control access to the storage compartment.

Trunk 320 may include a trunk base 322 forming a floor of the trunk 320. The trunk 320 may also include one or more stiffening elements positioned across one or both of a width or length of the trunk base 322 to help strengthen the trunk 320 and to protect against side and/or frontal impacts. For example, a support beam 324 may extend across a width of the trunk base 322. The support beam 324 may be positioned proximate a rear wall 326 of the trunk 320. In some embodiments, the trunk 320 includes a shelf 328 that extends from the rear wall 326. The shelf 328 may be positioned across the width of the trunk 320, with the support beam 324 being positioned adjacent the rear wall 326. In some embodiments, one or more embossed ribs and/or other embossed features may be formed into and extend across one or both of a length or the width of the trunk base 322.

In some embodiments, the support beam 324 defines an open interior having a number of ribs extending along a length of the support beam 324. For example the support beam 324 may include a top wall 330, a front wall 332, a rear wall 334, and a bottom wall 336. The support beam 324 may have a trapezoidal cross-section. For example, the top wall 330 may have a greater length than the rear wall 334 such that the front wall 332 and/or the rear wall 334 must be angled to connect the top wall 330 and bottom wall 336. Ribs may be provided to connect the various walls within the interior to provide enhanced strength and rigidity.

To facilitate the formation of the ribs, the support beam 324 may be extruded from aluminum such that any ribs are formed along with the outer walls of the support beam 324. In some embodiments, connection points between the ribs and the outer walls of the support beam 324 may taper outward such that a thickness near the connection point is greater than a thickness of the rest of the ribs. Similarly, junctions of the ribs with one another may also have greater thicknesses than the rest of the ribs. In some embodiments, the trunk base 322 and support beam 324 may be formed integral with one another, while in other embodiments the components may be fabricated separately and later welded, fastened, and/or otherwise secured to one another.

Figure 8:
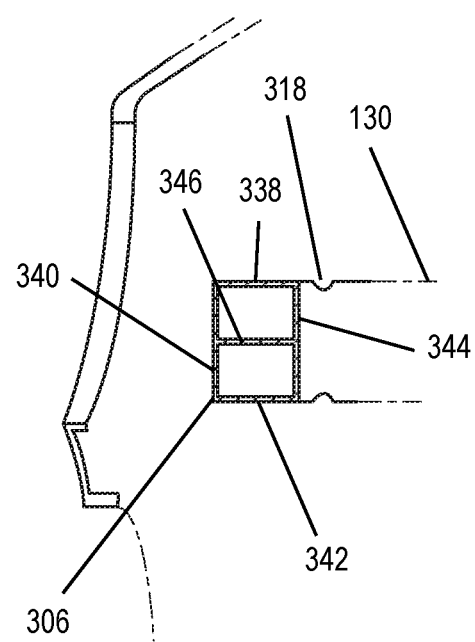
FIG. 8 depicts a front impact system according to embodiments.

FIG. 8 depicts a front impact system of the electric vehicle 100. The system may include the front crash cross beam 306 having ends that bend backward relative to a medial portion of the front crash cross beam 306 extending across a front end of the electric vehicle 100. The front crash cross beam 306 may serve as a bumper or forwardmost impact element of the vehicle 100. For example, a nose of the body of vehicle 100 may be positioned immediately in front of and cover the front crash cross beam 306. In some embodiments, a first end and a second end of beam 306 are angled rearward from a medial portion of the beam 306, thereby helping to define a front end shape of the vehicle 100. The front crash cross beam 306 may have a generally rectangular cross-section having an outer periphery defined by a top wall 338, a front wall 340, a lower wall 342, and a rear wall 344. In some embodiments, the outer periphery of the front crash cross beam 306 may define an interior having one or more ribs extending along a length of the front crash cross beam 306. For example, a rib 346 may extend horizontally between a center of the front wall 340 a center of the rear wall 344. Rib 346 may make front crash cross beam 306 more rigid and allow the front crash cross beam 306 to absorb a greater amount of impact force, as more force is needed to crumple or otherwise bend the rib 346, along with the rest of the front crash cross beam 306. Rib 346 may have a thickness of between about 0.1 and 1 cm to provide necessary strength while still keeping a weight of the front crash cross beam 306 sufficiently low. While shown with a single rib 346, it will be appreciated that any number of ribs may be included within the interior of the front crash cross beam 306. These ribs may be provided in any arrangement, however ribs extending either horizontally or diagonally between the front wall 340 and the rear wall 344 provide the most resistance to front impacts.

To facilitate the formation of the ribs, the front crash cross beam 306 may be extruded from aluminum such that any ribs are formed along with the outer walls of the front crash cross beam 306. In some embodiments, connection points between the ribs and the outer walls of the front crash cross beam 306 may taper outward such that a thickness near the connection point is greater than a thickness of the rest of the ribs. Similarly, junctions of the ribs with one another may also have greater thicknesses than the rest of the ribs.

A left crash beam 128 and a right crash beam 130 may be coupled with a rear surface of the front crash cross beam 306. Oftentimes, the left crash beam 128 and right crash beam 130 may be coupled to the medial portion of the front crash cross beam 306 such that the bent first end and second end are disposed laterally outward of the left crash beam 128 and right crash beam 130, respectively. The front crash cross beam 306 may be configured to transfer force from a front collision to the left crash beam 128 and/or the right crash beam 130. In some embodiments, each of the left crash beam 128 and the right crash beam 130 define an interior having one or more ribs to further strengthen the beam. As noted above, dimples 318 may be provided on the crash beams 128 and 130 to help the crash beams 128 and 130 deform in a most efficient manner to absorb force in the event of a frontal impact.

Front cross beam 114 may be coupled with a rear end of each of the left crash beam 128 and the right crash beam 130. The front cross beam 114 may form a portion of firewall 112 that is configured to separate the passenger compartment 108 from a motor compartment of the electric vehicle 100. The front cross beam 114 and/or other firewall components may be configured to direct force from the front collision away from the passenger compartment 108 such as by directing forces through one or more longitudinal support beams extending along the sides of the vehicle 100 and/or to one or more central cross beams via the rigid tunnel 110.

Figure 9:
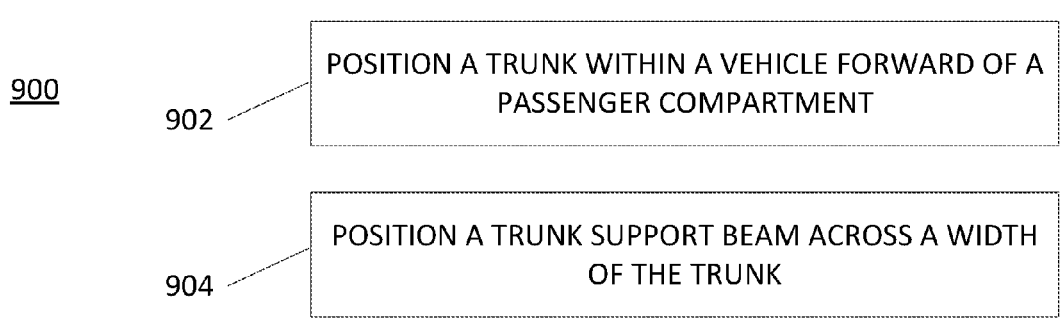
FIG. 9 is a flowchart depicting a method for directing force from a front impact with an electric vehicle according to embodiments.

FIG. 9 is a flowchart depicting a process 900 for directing force from a front impact with an electric vehicle. Process 900 may be performed using the electric vehicle 100 described herein. Process 900 may begin at block 902 by receiving a collision at a front cross beam of the electric vehicle. The impact may be received at any point along the length of the front cross beam. At least a portion of a force from the collision at the front cross beam may be absorbed by crumpling a portion of the front cross beam at block 904. The front cross beam may have a generally rectangular cross-section defined by the front wall, the rear wall, a top wall, and a bottom wall. The front cross beam may include one or more ribs formed within an interior of the beam. For example, a horizontal rib may extend between a front wall and a rear wall of the front cross beam. The crumpling may be encouraged by chamfering corners of the front cross beam. Once the front cross beam is crumpled, at least a portion of the force may be transferred from a rear edge of the front cross beam to at least one longitudinal crash beam at block 906. Some of the force may be absorbed by the longitudinal crash beam by crumpling at least some of the longitudinal crash beam at block 908. Like the front cross beam, each longitudinal crash beam may have chamfered corners that help initiate the crumpling of the crash beam. Additionally, each longitudinal crash beam may define an interior having one or more ribs.

In some embodiments, process 900 may also include transferring at least a portion of the force from a rear end of the at least one longitudinal crash beam to an intermediate cross beam. The intermediate cross beam may form a portion of a firewall configured to separate a passenger compartment of the electric vehicle from a motor compartment of the electric vehicle. The intermediate cross beam may be configured to absorb some of the force, while directing a remaining portion of the force from the front collision away from the passenger compartment. For example, the intermediate cross beam may direct forces through one or more longitudinal support beams extending along the sides of the vehicle and/or to one or more central cross beams via the rigid tunnel, thus minimizing forces that impact the occupants of the vehicle.

It should be noted that the systems and devices discussed above are intended merely to be examples. It must be stressed that various embodiments may omit, substitute, or add various procedures or components as appropriate. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known structures and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A front impact system for an electric vehicle, the front impact system comprising:
    a front crash cross beam extending across a front end of the electric vehicle, wherein the front crash cross beam defines an interior comprising at least one rib extending along a length of the front crash cross beam;
    a left crash beam coupled with a rear surface of the front crash cross beam;
    a right crash beam coupled with the rear surface of the front crash cross beam, wherein the front crash cross beam is configured to transfer force from a front collision to one or both of the left crash beam or the right crash beam; and
    a front cross beam coupled with a rear of each of the left crash beam and the right cross beam, wherein:
        the front cross beam comprises a first end, a second end, and a medial portion, the first end and the second end bending rearward from the medial portion;
        the front cross beam defines an open interior comprising a number of ribs that extend along a length of the front cross beam;
        the front cross beam forms a portion of a firewall configured to separate a passenger compartment of the electric vehicle from a motor compartment of the electric vehicle;
        the front cross beam is configured to direct force from the front collision away from the passenger compartment.

2. The front impact system for an electric vehicle of claim 1, wherein:
    the at least one rib comprises a rib extending between a center of a front wall of the front crash cross beam and a center of a rear wall of the front cross beam.

3. The front impact system for an electric vehicle of claim 1, wherein:
    a thickness of the at least one rib is between about 0.1 and 1 cm.

4. The front impact system for an electric vehicle of claim 1, wherein:
    the front crash cross beam has a generally rectangular cross-section.

5. The front impact system for an electric vehicle of claim 1, wherein:
    the front crash cross beam comprises extruded aluminum.

6. A front impact system for an electric vehicle, the front impact system comprising:
    a front crash cross beam extending across a front end of the electric vehicle, wherein:
    the front crash cross beam has a generally rectangular cross-section defined by a front wall, a top wall, a rear wall, and a bottom wall;
    the front crash cross beam comprises a rib extending along a length of the front cross beam between a center of the front wall and a center of the rear wall;
    a left crash beam coupled with a rear surface of the front crash cross beam;
    a right crash beam coupled with the rear surface of the front crash cross beam, wherein the front crash cross beam is configured to transfer force from a front collision to one or both of the left crash beam or the right crash beam; and
    a front cross beam coupled with a rear of each of the left crash beam and the right cross beam, wherein:

the front cross beam comprises a first end, a second end, and a medial portion, the first end and the second end bending rearward from the medial portion;

the front cross beam defines an open interior comprising a number of ribs that extend along a length of the front cross beam;

the front cross beam forms a portion of a firewall configured to separate a passenger compartment of the electric vehicle from a motor compartment of the electric vehicle;

the front cross beam is configured to direct force from the front collision away from the passenger compartment.

7. The front impact system for an electric vehicle of claim 6, wherein:

the front crash cross beam comprises extruded aluminum.

8. A method of directing force from a front impact with an electric vehicle, the method comprising:

receiving a collision at a front crash cross beam of the electric vehicle;

absorbing at least a portion of a force from the collision at the front crash cross beam by crumpling a portion of the front crash cross beam including a horizontal rib extending between a front wall and a rear wall of the front crash cross beam;

transferring at least a portion of the force from a rear edge of the front crash cross beam to at least one longitudinal crash beam;

absorbing at least a portion of the force by crumpling at least some of the at least one longitudinal crash beam; and transferring at least a portion of the force from a rear end of the at least one longitudinal crash beam to a front cross beam, wherein:

the front cross beam comprises a first end, a second end, and a medial portion, the first end and the second end bending rearward from the medial portion;

the front cross beam defines an open interior comprising a number of ribs that extend along a length of the front cross beam;

the front cross beam forms a portion of a firewall configured to separate a passenger compartment of the electric vehicle from a motor compartment of the electric vehicle;

the front cross beam is configured to direct force from the front collision away from the passenger compartment.

9. The method of directing force from a front impact with an electric vehicle of claim 8, wherein:

the front crash cross beam comprises a generally rectangular cross-section defined by the front wall, the rear wall, a top wall, and a bottom wall.

10. The method of directing force from a front impact with an electric vehicle of claim 8, wherein:

a thickness of the horizontal rib is between about 0.1 to 1 cm.

* * * * *